(No Model.)

C. F. GODDARD.
ROLLER PLOW.

No. 251,357. Patented Dec. 27, 1881.

Witnesses:
C. S. Prime
Wm H Redfield

Inventor.
Charles F. Goddard

UNITED STATES PATENT OFFICE.

CHARLES F. GODDARD, OF WEST MITCHELL, IOWA.

ROLLER-PLOW.

SPECIFICATION forming part of Letters Patent No. 251,357, dated December 27, 1881.

Application filed December 20, 1880. (No model.)

*To all whom it may concern:*

Be it known that I, CHARLES F. GODDARD, a citizen of the United States, residing at West Mitchell, in the county of Mitchell and State of Iowa, have invented a new and useful Roller-Plow, of which the following is a specification.

My invention relates to plows, and has for its object to provide a plow which shall enable the operator to ride, and which shall be of lighter draft and more efficient in operation than those heretofore in use. I attain these objects by the mechanism illustrated in the accompanying drawings, in which—

Figure 2:
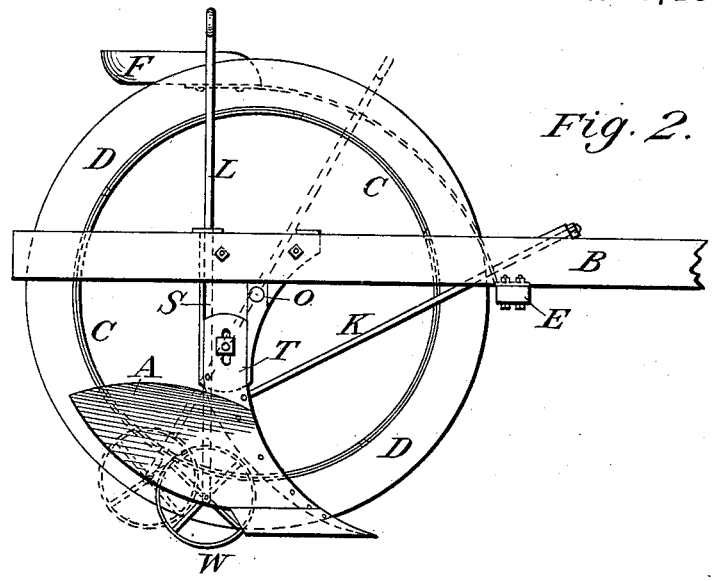
Figure 1:
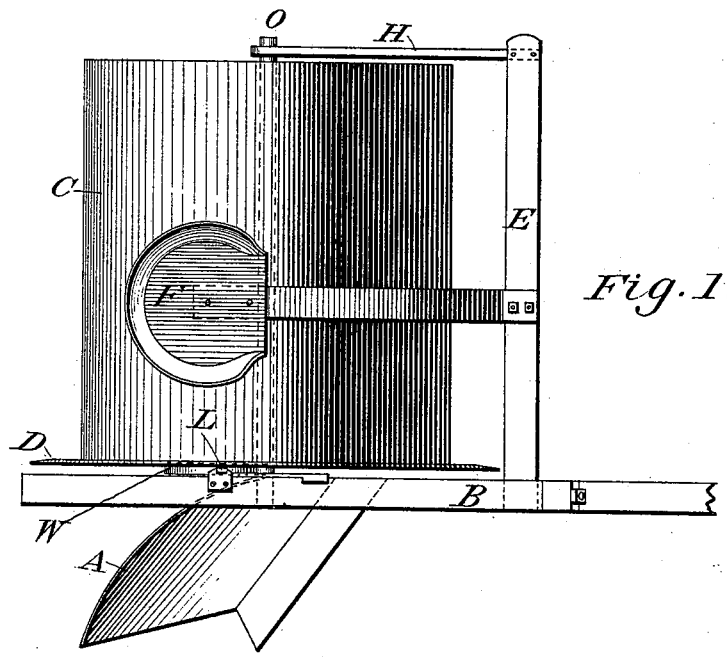

Figure 1 is a top view, and Fig. 2 is a side view, of the machine.

Similar letters refer to similar parts in both views.

C is a cylinder or roller, preferably made of wooden staves with wooden heads and its staves covered with sheet-iron.

B is the beam of the plow, and is long enough to also form the tongue of the plow, by which it is guided. To the beam B is bolted the standard S. The roller-shaft O extends through the standard S, and is firmly keyed or otherwise attached thereto.

A is the plow proper, which, with its share, is bolted through its standard T to the beam-standard S. The bolt-hole through the plow-standard T is slotted nearly vertically to permit the plow to be adjusted to different depths of furrow. The plow is braced by the brace K, which extends through the beam B, and is attached to the plow-standard T, as shown. The cross-piece E is bolted to the under side of the beam B, and at its other end to the brace H, which, in its turn, is attached to the roller-shaft O, as shown in Fig. 1.

F is the driver's seat, which is attached by its spring to the cross-piece E, as shown in the drawings.

D D is a disk of polished steel, which is attached by lugs or bolts to the plow end of the roller C. This disk D D is the colter of the plow, and also serves as a landside by steadying the plow and preventing it from being forced sidewise by the pressure of the furrow-slice against the mold-board and share when in operation.

L is the lifting-lever. It is provided with a wheel, W, at its lower end, and is pivoted to the plow-standard T, as shown. When in operation the lever L is thrown forward into the position shown by the dotted lines. In this position it will be seen that the wheel W is slightly above the bottom line of the furrow. When it is desired to raise the plow out of the ground, as in turning, &c., the lever L is pulled back into a vertical position, which brings the wheel W lower than the bottom of the plow. Consequently as the plow continues to advance it is raised out of the ground, taking with it the colter D D and the plow end of the roller C. The whole machine is thus left standing on the wheel W and the end of the roller that is farthest from the plow, when it may be readily turned around, like a cart, or driven over the field or road, the lever L being held in a vertical position by a catch on top of the beam B, as shown in Fig. 2. The staves of the roller C project over the head next the plow to give room for the beam-standard S, and prevent all danger of contact of the roller and plow. The shaft O is fixed, and the roller C revolves freely about it.

A clevis to give lateral and vertical variation of the hitch is attached to the cross-piece E, but not shown in the drawings.

By shortening or lengthening the brace K by means of the nut on its upper end the point of the plow may be raised or lowered.

Having thus fully described my invention, what I claim as new, and desire to secure by Letters Patent, is as follows:

1. In combination, a land-roller, C, a disk-colter, D, attached thereto, beam B, and a plow supported by the roller, substantially as shown and described.

2. In a plow attached to a land-roller, the combination of the roller C, having disk-colter D, shaft O, beam B, plow-standard S T, and plow A, substantially as shown and described.

3. The lever L and wheel W, in combination with roller C, disk D, beam B, shaft O, and plow A, substantially as shown and described.

CHARLES F. GODDARD.

Witnesses:
G. T. FRAZEE,
WM. H. REDFIELD.